W. S. JOHNSTON.
TIRE.
APPLICATION FILED JAN. 25, 1922.

1,410,475. Patented Mar. 21, 1922.

Inventor
Walter S. Johnston,
By
Attorneys

UNITED STATES PATENT OFFICE.

WALTER S. JOHNSTON, OF DETROIT, MICHIGAN.

TIRE.

1,410,475.  Specification of Letters Patent.  Patented Mar. 21, 1922.

Application filed January 25, 1922. Serial No. 531,553.

*To all whom it may concern:*

Be it known that I, WALTER S. JOHNSTON, a citizen of the United States of America, residing at Detroit, in the county of Wayne and State of Michigan, have invented certain new and useful Improvements in Tires, of which the following is a specification, reference being had therein to the accompanying drawings.

This invention relates to vehicle tires and more particularly to a filling for tire casings, whereby a tire of limited resiliency is secured.

An object of the invention is to provide a filling for tire casings so constructed as to provide a support for the side walls of the casing and give a limited resiliency.

A further object is to provide a construction wherein the casing is protected against wear due to contact with a substantially unyielding filler block and to lend to an otherwise substantially unyielding filler, a limited yielding action under load.

With the above and other ends in view, the invention consists in providing a casing filler comprising a substantially unyielding rigid material arranged to provide a support for the sides of the casing, together with yieldable material arranged to yield under the shocks and jars of the load.

The invention further consists in providing a wood filler, the cross-sectional diameter in one direction of which is less than the internal diameter of the casing and is of the same cross-sectional diameter in the other direction, and in supplementing this wooden filler with yieldable strips preferably of comparatively soft rubber to completely fill the casing in conjunction with the wood filler.

The invention further consists in certain other matters hereinafter set forth, and all as more particularly pointed out in the appended claim, reference being had to the accompanying drawing in which—

Figure 1:
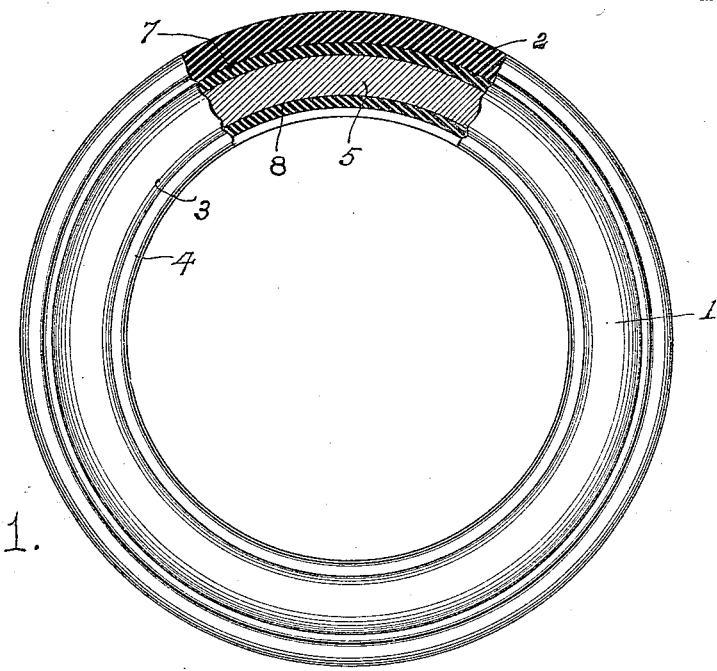
Fig. 1 is a side elevation of a tire illustrative of the invention, with portions broken away and in section to more clearly show the construction.

In the drawing, 1 indicates a casing of the usual construction made up of layers of fabric and rubber in any old and well known manner, and formed with a tread portion 2 and side portions 3 having beads 4 adjacent the annular inner edges of the casing sides for engaging a wheel rim (not shown). Any suitable form and construction of tire casing may be employed, the invention consisting in providing a semi-rigid unyielding filler for a casing and of a new and novel construction having the several advantages hereinafter set forth.

Figures 2, 3:
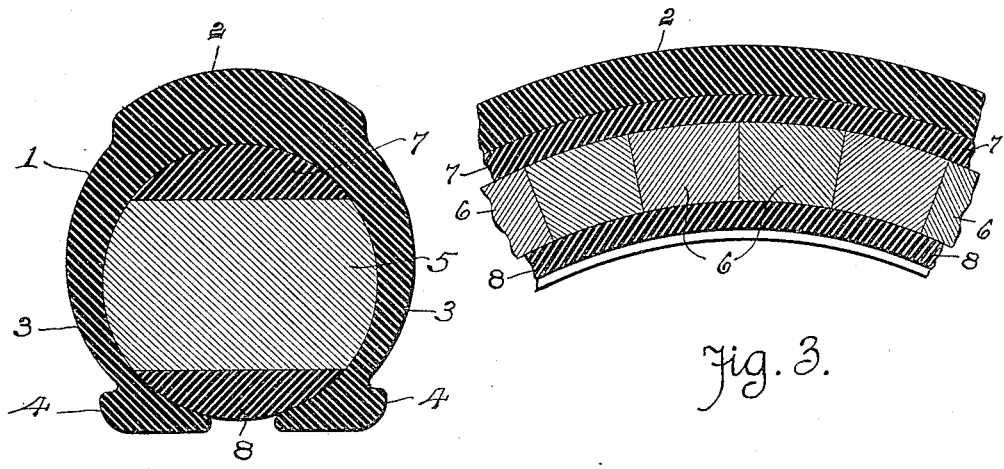
Fig. 2 is an enlarged transverse section of the tire.
Fig. 3 is a longitudinal section through a portion of the tire illustrating a slightly modified construction.

The casing filler comprises a member 5 which is preferably of wood, wood fiber or like material and is arranged centrally within the casing and of a size to take up a major portion of the space within the casing, said member being of a width equal to the internal diameter of the casing with the width of said member extending transversely of the casing between the sides 3 thereof. Said member 5 is of annular form and may be continuous or made up of a series of segmental sections 6, as shown in Fig. 3. The outer and inner sides of this annular filler member or block 5 are flattened or cut away to provide a space between the block and the inner surface of the tread portion of the tire and also to provide a like space between the inner side of the block and the edges of the casing which are adapted to be engaged with a wheel rim. These spaces are annular and of substantially crescent-shape in cross section and are completely filled with a resilient material, preferably soft rubber molded into annular form with an outer curved surface to fit the curvature of the inner face of the casing and an inner substantially flat side to engage the adjacent flat side of the filler block 5, said strips 7 and 8 forming annular yieldable cushions at the inner and outer sides of the semi-rigid unyielding annular center filler block 5. As the annular filler block is formed of wood or similar material, it is substantially non-compressible but has a certain amount of resiliency and particularly if made up of sections, as shown in Fig. 3, will yield under load, and as this block is of the full width of the interior of the casing, the side edges engage and support the sides 3 of the casing, preventing these casing sides from being bent, distorted, or broken down under heavy load on the tire. In other words, the block forms a non-compressible support for the casing sides and as it extends across the casing from side to side thereof, it also forms non-compressible means for holding the casing distended. A limited resiliency is given the tire by providing the rubber cushion strips 7 and 8 at the inner and outer sides of the block 5 and this resiliency is provided at such points that the flexure of the casing upon compression of these cushions will not come upon those portions of the casing which will cause disintegration thereof. The casing is therefore protected by the filling against disintegration or breaking down due to flexure and at the same time the tire is given sufficient resiliency to absorb the ordinary shocks.

A tire is thus provided having the appearance of the ordinary pneumatic tire and which is non-puncturable and non-deflatable. Further, a tire is provided having maximum wearing qualities as it may be used until the casing is worn through and will no longer hold, when a new casing may be provided and the same filler placed therein, the filler, because of completely filling the space within the casing, will not be worn or will not abrade the inner surface of the casing, there being no shoulders or projections upon the rigid or unyielding central portion or block 5 to engage the casing and cause disintegration thereof due to rubbing action thereon. If found desirable, the annular rubber strips or cushions 7 and 8 may be cemented or otherwise secured to the flat faces of the annular center member 5.

As previously stated the casing 1 may be of any desired form and construction and obviously other changes in the construction may be made within the scope of the appended claim without departing from the spirit of the invention and I do not therefore limit myself to the particular construction shown.

Having thus fully described my invention, what I claim is:—

A tire comprising a casing formed with a tread portion and side portions having rim engaging beads, an annular filler block of non-compressible material within the casing and of a width equal to the internal diameter of the casing, the width of said annular block extending transversely of the casing between the sides thereof and in contact with said sides, the outer edges of said block being curved to conform to the curvature of the inner face of the wall of the casing and having substantially flat inner and outer sides, and annular strips of comparatively soft resilient material seated upon the flat upper and lower sides of the block and filling the spaces within the casing between said sides of the block and the wall of the casing.

In testimony whereof I affix my signature in presence of two witnesses.

WALTER S. JOHNSTON.

Witnesses:
 LEWIS E. FLANDERS,
 KARL H. BUTLER.